Sept. 6, 1932.   H. P. HASTINGS   1,875,378
FUSIBLE DISCONNECTING PLUG
Filed Oct. 27, 1930
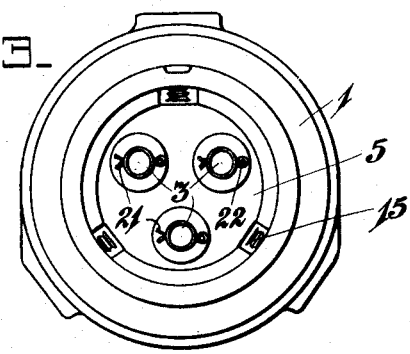
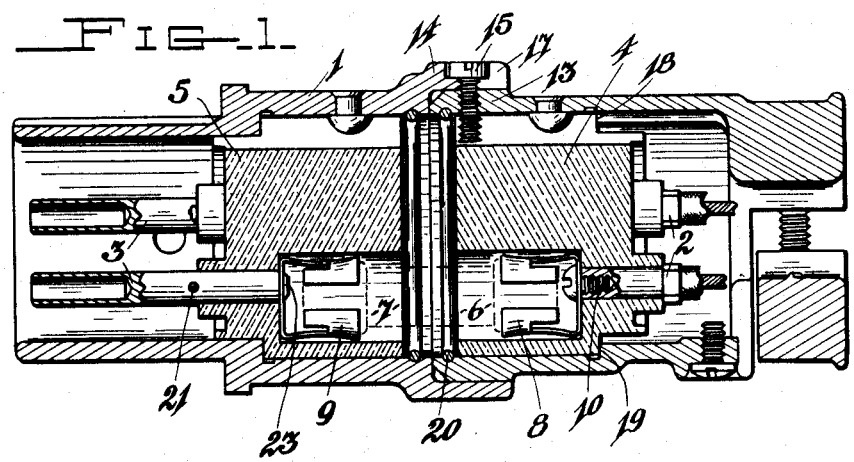
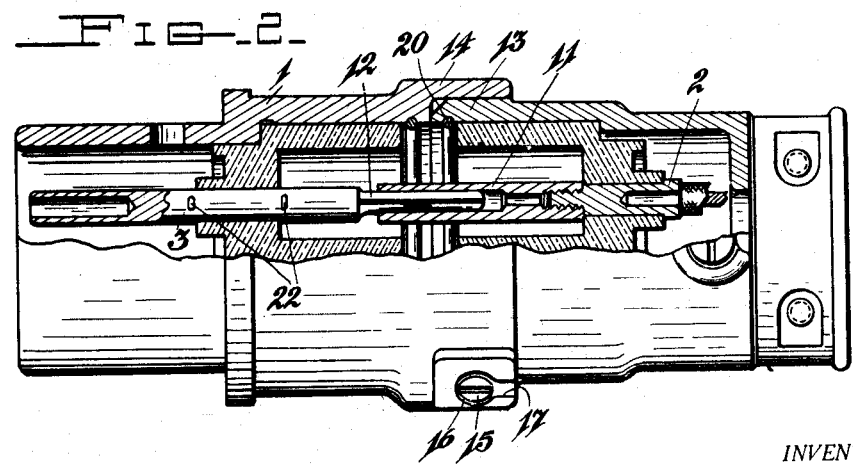
INVENTOR:
Harold P. Hastings,
BY Bodell & Thompson
ATTORNEYS.

Patented Sept. 6, 1932

1,875,378

UNITED STATES PATENT OFFICE

HAROLD P. HASTINGS, OF SYRACUSE, NEW YORK, ASSIGNOR TO CROUSE-HINDS COMPANY, OF SYRACUSE, NEW YORK, A CORPORATION OF NEW YORK

FUSIBLE DISCONNECTING PLUG

Application filed October 27, 1930. Serial No. 491,406.

This invention has for its object what for convenience I have called an electrical fused disconnecting plug for connecting and disconnecting electrically operated portable tools, portable lighting or heating units, or other portable electrical apparatus, in a feed circuit, the disconnecting plug embodying one or more fuses for protecting the portable electrical apparatus, which disconnecting plug is particularly simple and compact in construction and highly efficient in use.

The invention consists in the novel features and in the combinations and constructions hereinafter set forth and claimed.

In describing this invention, reference is had to the accompanying drawing, in which like characters designate corresponding parts in all the views.

Figure 1 is a longitudinal sectional view through a fused disconnecting plug embodying this invention.

Figure 2 is an elevation, partly in section, thereof.

Figure 3 is an end view looking to the right in Figure 1.

This fused disconnecting plug is useful in protecting any type of portable electrical apparatus such as portable lighting or heating devices or portable tools, and is especially useful in protecting so-called "high cycle" or high frequency tools, on account of their peculiar characteristics.

High frequency tools are usually operated from special circuits furnishing three-phase alternating current at a frequency considerably higher than that of most commercial electric supply lines. The motors are small, high speed, quick starting, quick accelerating. It is these characteristics that make them especially useful in heavy production, but these characteristics also cause the motors to burn out quickly if heavily overloaded, stalled, or caused to operate on one phase, which occurs if one of the three wires in the portable leads or cables becomes broken. This happens not infrequently where the tools and connecting cables are subjected to hard usage.

For these reasons it is especially important to provide individual fuse protection for each tool.

It has been attempted to provide this protection by individual fuses at each plug socket, as the sockets are permanently mounted. However, tools of different size may be connected to the same socket at different times. The fuses must operate at a load only slightly exceeding the overload capacity of the tool so as to give it proper protection. Therefore the fuses should be associated with the tool rather than with the socket. Since a plug is always permanently attached to a certain tool by means of the portable cable, the plug is a very logical location for the fuses.

A plug may have any convenient number of plug terminals and wire terminals corresponding to the socket and wiring system with which it is to be used. It may have an equal or any less number of fuses. For example, a plug having three plug terminals and three wire terminals may have one, two or three fuses. If provided with one fuse, it is suitable for various purposes such as a two-wire circuit one wire of which is grounded, and for an extra wire for grounding the frame of the portable device. If provided with two fuses, it is suitable for such uses as a two-wire ungrounded circuit with extra wire for grounding the frame, or a three-wire circuit with one wire grounded. If provided with three fuses, it is suitable for a three-wire circuit in which none of the circuit conductors are grounded. A three-phase circuit not grounded, or grounded at the neutral connection if supplied from star-connected transformers, would be examples of such a circuit.

The illustrated embodiment of my invention is a three-terminal, two-fuse plug, but the same principles and same novel features may be incorporated in a plug of any number of terminals and fuses.

The fused disconnecting plug comprises generally a suitable body having wire and plug terminals and means for supporting them within the body, and also means for supporting one or more fuses, each fuse being supported between one wire terminal and a corresponding plug terminal. The body with its wire and plug terminals and fuses, when assembled, as a unit or self-contained structure, make up the complete fused plug.

The plug is usually carried at the end of the cable leading to the tool and plugged into a socket mounted on the wall, post, floor, or other support and in the use of the term "plug and socket" no distinction is intended to be made herein between a plug and a socket, that is, insofar as this invention is concerned, the male members may be carried by the plug and the female by the socket or vice versa. In the drawing, the plug only is shown.

1 designates the body which is usually tubular in form and made of metal. 2 designates wire terminals and 3 plug terminals mounted and supported in opposite ends of the body. These terminals are carried respectively by blocks 4, 5 of insulation mounted in the body.

The plug here shown is for a three-wire system and there are three wire terminals and three plug terminals, one of the wire terminals and one of the plug terminals forming part of the grounded conductor and being connected together without being fused.

The body is also formed with a fuse compartment intermediate of its ends in which is located a fuse or fuses, each for connecting one wire terminal and one plug terminal, the body having a movable portion for making the fuse accessible. In the three wire system, either or both pairs of wire and plug terminals may be connected by fuses located within the body, the third wire, which is grounded, being unprovided with a fuse, as before stated.

In the illustrated embodiment of my invention, the fuse compartment is provided by forming the blocks 4, 5 with alined recesses 6, 7 opening through the opposing ends of the blocks and the fuse contacts 8, 9 are mounted respectively in the recesses and connected to the wire and fuse terminals 2, 3, respectively.

In the illustrated embodiment of this invention, the fuses are standard cartridge fuses of the capacity the tool requires and the contacts 8, 9 are sockets or clips for receiving the ends of the cartridge fuses. Contact 8 is secured to its companion wire terminals 2 by a screw 10 extending through the bottom of the contact and threading axially into the terminal 2. The terminal 2 extends through a passage opening into the bottom of the recess 6. The terminal 3 extends through a passage opening through the bottom of the recess 7, and is secured, as by riveting at 23, to the bottom of the fuse contact 9. The terminals 2 and 3 of the ground conductor, as here shown, consists of a socket 11 connected to the ground wire terminal 2 and a plug 12 connected to the ground plug terminal 3, the plug fitting into the socket 11. These two parts 11 and 12 are located in recesses in the blocks 4, 5 similar to the recesses 6, 7.

In order that the fuses may be readily accessible, the body 1 is provided with a movable portion, which, when moved, opens up the fuse compartment and as here shown, the body is composed of two tubular sections arranged end to end, the wire terminals and supports being arranged in one section and the plug terminals and their supports in the other section and the fuse contacts carried respectively within the sections so that when the sections are separated, the fuses are accessible.

In the illustrated embodiment of my invention, the section of body 1 in which the wire terminals and their supports are located has an end portion 13, which telescopes into a bell 14 at the end of the section in which the plug terminals are located, and the sections are normally held from separation by screws 15 extending radially through openings 16 in the bell and threading into the portion 13. The screw openings in the bell are provided with slots 17 of sufficient width to permit the shanks of the screws to pass therethrough, after the screws have been loosened, so that complete removal of the screws is not necessary to separate the sections. The block of insulation 4 is formed with a shoulder 18 at its inner end abutting against an internal shoulder 19 in the section of the body in which the wire terminals are located and the block 4 is held against the shoulder 18 by a snap ring 20. The block 5 is similarly held in the section of the body 1 in which the plug terminals are located.

The plug terminals 3 are somewhat loosely mounted in order to have lateral movement in all directions, that is a self-centering movement for conforming or alining with the socket and plug terminal, when the plug is being engaged with the socket.

The plug terminal 3 connected to the fuse contact 9 is held from displacement by the fuse contact to which it is riveted and by a transverse key 21 extending diametrically therethrough in the outer end of the passage of the block 5 in which the terminal is located. The terminal 3 of the grounded conductor is held from axial displacement by two of such keys 22 located at the inner and outer ends of the passage in the block 5 in which the grounded plug terminal 3 is located. This mounting permits the grounded plug terminal 3 to have a self-centering action not only with the complemental terminal of the socket but also permits the plug 12 to center relatively to the socket 11.

In use, when the tool is overloaded or becomes stalled one or the other or both of the fuses are burnt out before the motor of the tool has been sufficiently heated to burn out and if one fuse burns out and the motor runs single phase and is stalled the other fuse will burn out. When either or both fuses are burned out, they can be readily removed by loosening the screws 15 and separating the sections of the body, the fuse usually remaining with one or the other of the sections so that when the sections are separated, the fuses can be removed. New fuses are inserted in contact with either fuse contacts 8 or 9 and then the body sections are reassembled and during the reassembling the fuse will make contact with both contacts 8 and 9.

By this fused disconnecting plug, the fuses are mounted in a particularly compact manner and the disconnecting plug is not materially larger than the standard unfused disconnecting plugs heretofore used with the electrically operated portable tools.

What I claim is:

1. In an electrical fused disconnecting plug, the combination of a hollow body consisting of two abutting sections, each section having a terminal block detachably mounted therein, wire terminals carried by one block and plug terminals carried by the other block, the terminal blocks having complemental recesses for receiving fuses formed in their ends toward the abutting ends of the body sections, fuse clips located in the bottom of the recesses and being connected to the wire and plug terminals respectively, and means for detachably holding the body sections together.

2. In an electrical fused disconnecting plug, the combination of a body formed in two sections abutting end to end, one section having a terminal block detachably mounted therein, the terminal block carrying plug terminals, the body section extending over the plug terminals, the other body section having a terminal block detachably mounted therein, the terminal block carrying wire terminals, complemental recesses formed in the ends of the terminal blocks toward the abutting ends of the sections, fuse clips located in the bottom of the recesses and connected to the plug terminals and to the wire terminals respectively, and means for detachably holding the body sections together.

In testimony whereof, I have hereunto signed my name at Syracuse, in the county of Onondaga, and State of New York, this 25th day of October, 1930.

HAROLD P. HASTINGS.